(12) United States Patent
Shimizu et al.

(10) Patent No.: US 8,028,715 B2
(45) Date of Patent: Oct. 4, 2011

(54) CHECK VALVE FOR VACUUM SEWAGE PIPE AND VACUUM SEWAGE SYSTEM

(75) Inventors: Osamu Shimizu, Tokyo (JP); Yuji Hiroto, Tokyo (JP); Keisuke Ikeda, Tokyo (JP); Fuyuki Ogaki, Hokkaido (JP)

(73) Assignee: Ebara Corporation, Tokyo (JP)

( * ) Notice: Subject to any disclaimer, the term of this patent is extended or adjusted under 35 U.S.C. 154(b) by 556 days.

(21) Appl. No.: 11/550,963

(22) Filed: Oct. 19, 2006

(65) Prior Publication Data

US 2008/0083464 A1 Apr. 10, 2008

(30) Foreign Application Priority Data

Oct. 10, 2006 (JP) .................................. 2006-276940

(51) Int. Cl.
*F16K 35/00* (2006.01)
(52) U.S. Cl. .................. 137/465; 137/527.2; 137/527.8; 251/92; 251/93; 251/100; 251/101; 251/111; 251/82
(58) Field of Classification Search .................. 137/385, 137/465, 527, 527.2, 527.8; 251/82, 92, 251/93, 95, 96, 97, 100, 101, 111
See application file for complete search history.

(56) References Cited

U.S. PATENT DOCUMENTS

| | | | | |
|---|---|---|---|---|
| 655,741 A * | 8/1900 | Scott | | 169/22 |
| 1,811,611 A * | 6/1931 | Carlson | | 210/116 |
| 2,999,666 A * | 9/1961 | Sjogren | | 251/82 |
| 3,177,894 A | 4/1965 | Camp | | |
| 3,730,884 A | 5/1973 | Burns et al. | | |
| 4,477,051 A * | 10/1984 | Ben-Yehuda | | 251/30.01 |
| 4,637,425 A | 1/1987 | Petersen | | |
| 4,706,706 A * | 11/1987 | Page et al. | | 137/527.8 |
| 4,887,792 A * | 12/1989 | Kuo | | 251/82 |
| 5,083,885 A * | 1/1992 | Ushitora et al. | | 405/36 |
| 5,622,205 A * | 4/1997 | Petersen | | 137/527.8 |
| 5,746,246 A * | 5/1998 | Yokota et al. | | 137/514 |
| 6,152,173 A * | 11/2000 | Makowan | | 137/556.3 |
| 6,314,993 B1 * | 11/2001 | Matthews et al. | | 137/527 |

FOREIGN PATENT DOCUMENTS

| | | |
|---|---|---|
| JP | 28-12077 | 12/1953 |
| JP | 03-247827 A | 11/1991 |
| JP | 09-144120 A | 6/1997 |
| JP | 10-168999 A | 6/1998 |

OTHER PUBLICATIONS

International Search Report of PCT/JP2007/070215, date of mailing Feb. 12, 2008.

* cited by examiner

*Primary Examiner* — Stephen M Hepperle
*Assistant Examiner* — William McCalister
(74) *Attorney, Agent, or Firm* — Westerman, Hattori, Daniels & Adrian, LLP

(57) ABSTRACT

The present invention provides a check valve for use in a vacuum sewage pipe. The check valve includes a body having a sewage inlet and a sewage outlet to be coupled to the vacuum sewage pipe, a flap valve element disposed in the body and rotatably supported by a first shaft, and a closing mechanism. The closing mechanism can keep the flap valve element in a closed state so as to allow the flap valve element to function as a gate valve. The closing mechanism can also limit an opening degree of the flap valve element so as to allow the flap valve element to function as a check valve.

9 Claims, 14 Drawing Sheets

Multistep lift

CHECK VALVE FOR VACUUM SEWAGE PIPE AND VACUUM SEWAGE SYSTEM

BACKGROUND OF THE INVENTION

1. Field of the Invention

The present invention relates to a check valve to be installed in a vacuum sewage pipe providing fluid communication between a source of sewage and a vacuum station of a vacuum sewage collection system, and also relates to a vacuum sewage system having a vacuum sewage pipe provided with such a check valve.

2. Description of the Related Art

FIG. 1 is a schematic view showing an example of a vacuum sewage system. As shown in this drawing, sewage, discharged from houses 100, factories, and the like, flows through gravity-flow-type inlet pipes 101 into vacuum valve units 102 which are buried underground. Each of the vacuum valve units 102 has a vacuum valve 103 operable to be opened when an amount of sewage stored therein reaches a predetermined value. Once the vacuum valve 103 is opened, the sewage is sucked via a vacuum sewage pipe 1, so that the sewage is collected in a sewage collection tank 105 of a vacuum station 104. The collected sewage is then delivered by delivery pumps 106 to a non-illustrated sewage treatment plant or the like.

The vacuum sewage pipe 1 is required to have section valves (gate valves) and inspection ports (test-ball insertion ports) for maintenance thereof A 2002-version vacuum sewage collection system technical manual (published by Japan Institute of Wastewater Engineering Technology) prescribes that the section valves are to be arranged at intervals of not more than 400 m in a main pipe and to be installed at junction points (points A in FIG. 1) where branch pipes (branch pipes 1B in FIG. 1) are joined to main pipes (main pipes 1A in FIG. 1). This manual also prescribes that the inspection ports are to be installed near the section valves and to be arranged at intervals of not more than 200 m.

When the sewage flows from the branch pipe 1B into the main pipe of the vacuum sewage pipe 1, as shown in FIG. 2, the sewage 107 flows not only in a downstream direction (indicated by arrow C), but also in an upstream direction (indicated by arrow D). This is because equal vacuum pressure is developed in all regions of the main pipe including the upstream side of the junction point A. Such a flow toward the upstream side would prevent a smooth flow of the sewage, resulting in an increased loss in the pipes. Thus, as shown in FIG. 3, in the conventional structures, it is recommended to install a check valve 108 near the junction point A so as to prevent the backward flow of the sewage.

Such a check valve can prevent the backward flow and can thus allow the sewage to flow smoothly. However, installation of the check valve itself incurs an increased cost.

SUMMARY OF THE INVENTION

The present invention has been made in view of the above drawback. It is therefore an object of the present invention to provide a check valve for use in a vacuum sewage pipe capable of serving not only as a check valve, but also as a gate valve (section valve) and an inspection port, and to provide a vacuum sewage system having a vacuum sewage pipe provided with such a check valve.

In order to solve the above drawbacks, one aspect of the present invention is to provide a check valve for use in a vacuum sewage pipe. The check valve includes a body having a sewage inlet and a sewage outlet to be coupled to the vacuum sewage pipe, a flap valve element disposed in the body and rotatably supported by a first shaft, and a closing mechanism for keeping the flap valve element in a closed state to allow the flap valve element to function as a gate valve.

In a preferred aspect of the present invention, the closing mechanism is adapted to limit an opening degree of the flap valve element.

In a preferred aspect of the present invention, the body has an opening and a lid closing the opening, and the lid is removable so that the opening serves as a test-ball insertion port.

Another aspect of the present invention is to provide a vacuum sewage system including a vacuum valve unit, a vacuum sewage pipe, a vacuum station, an automatic suction apparatus coupled to the vacuum sewage pipe, and the above check valve installed in the vacuum sewage pipe.

DETAILED DESCRIPTION OF THE PREFERRED EMBODIMENTS

Figure 4:
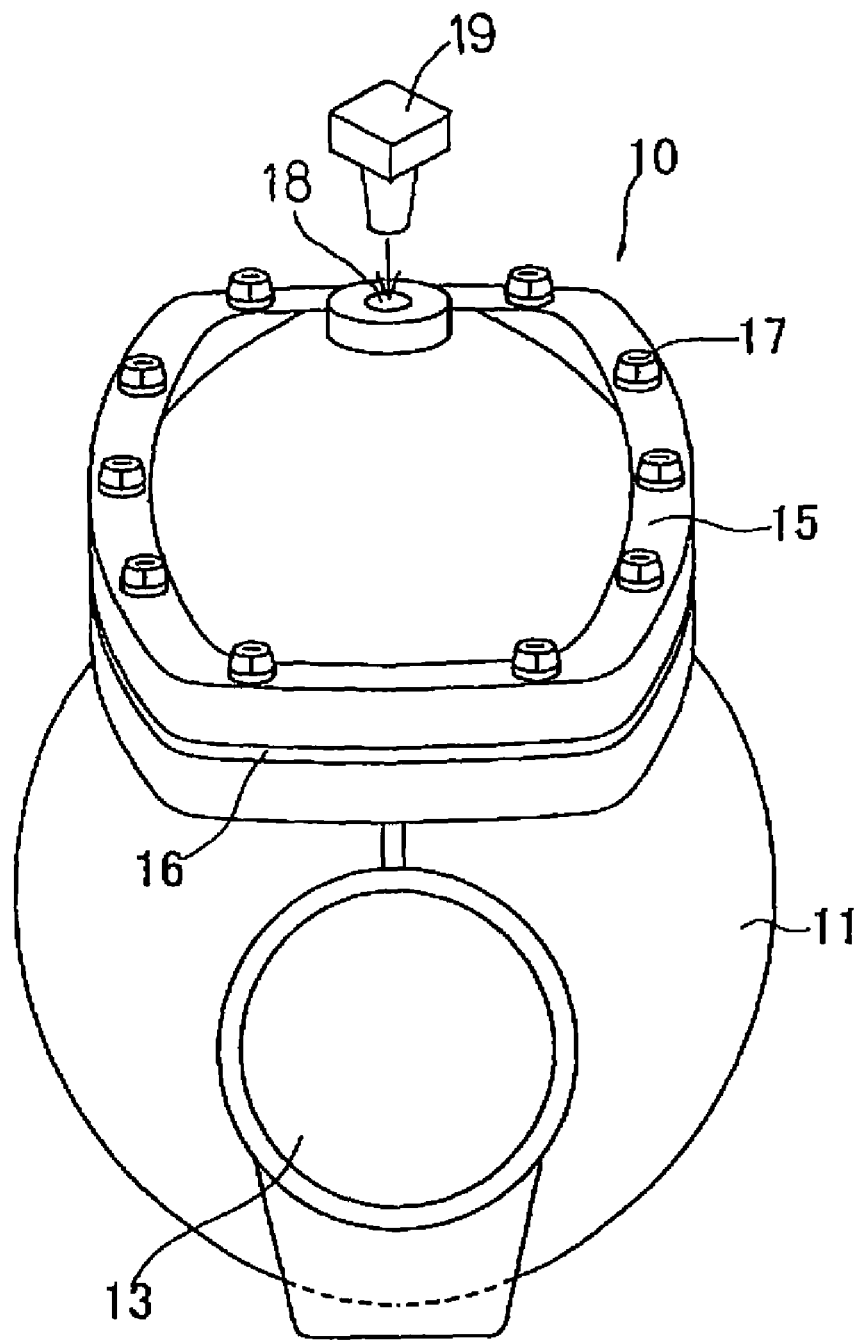
FIG. 4 is a front view showing a check valve for use in a vacuum sewage pipe according to the present invention.
Figure 5:
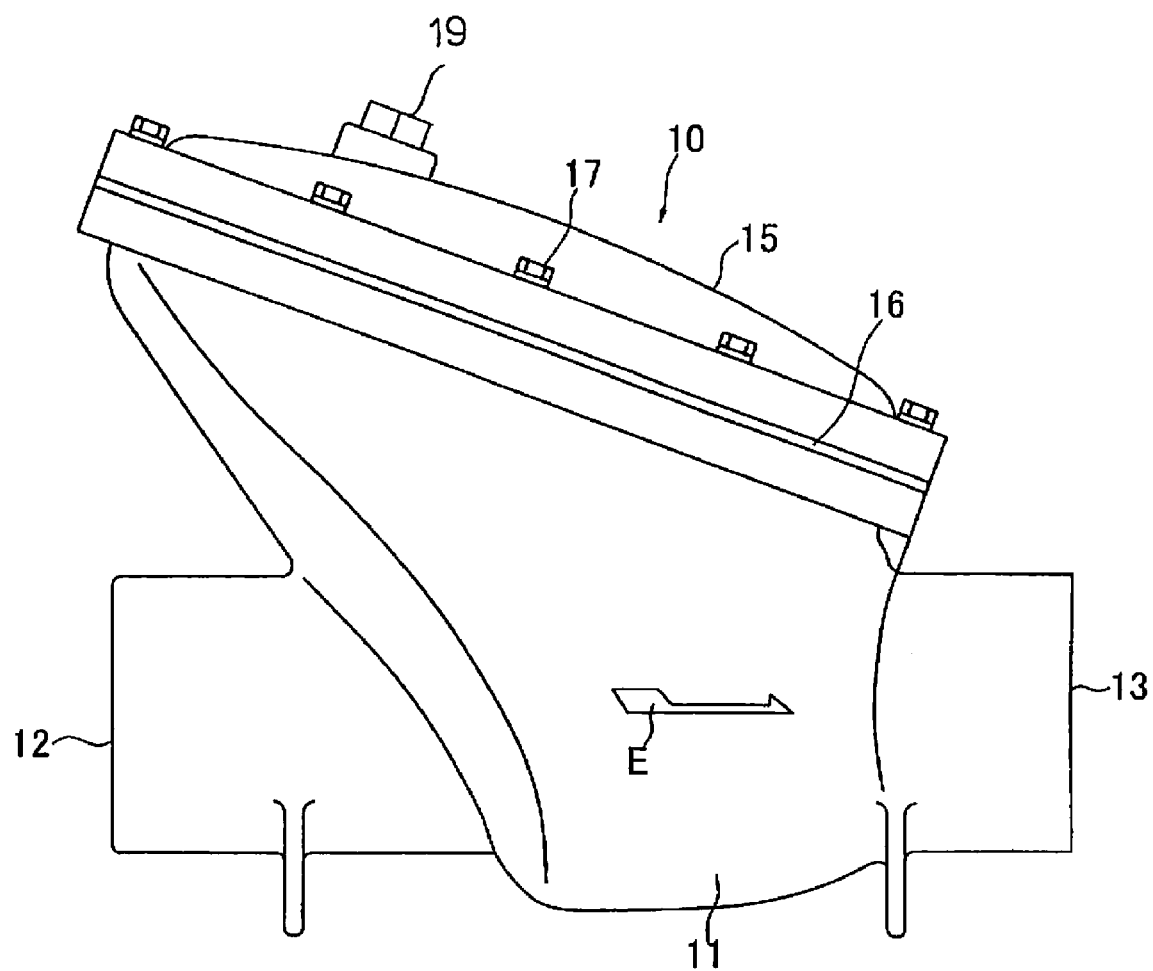
FIG. 5 is a side view showing the check valve for use in the vacuum sewage pipe according to the present invention.
Figure 6:
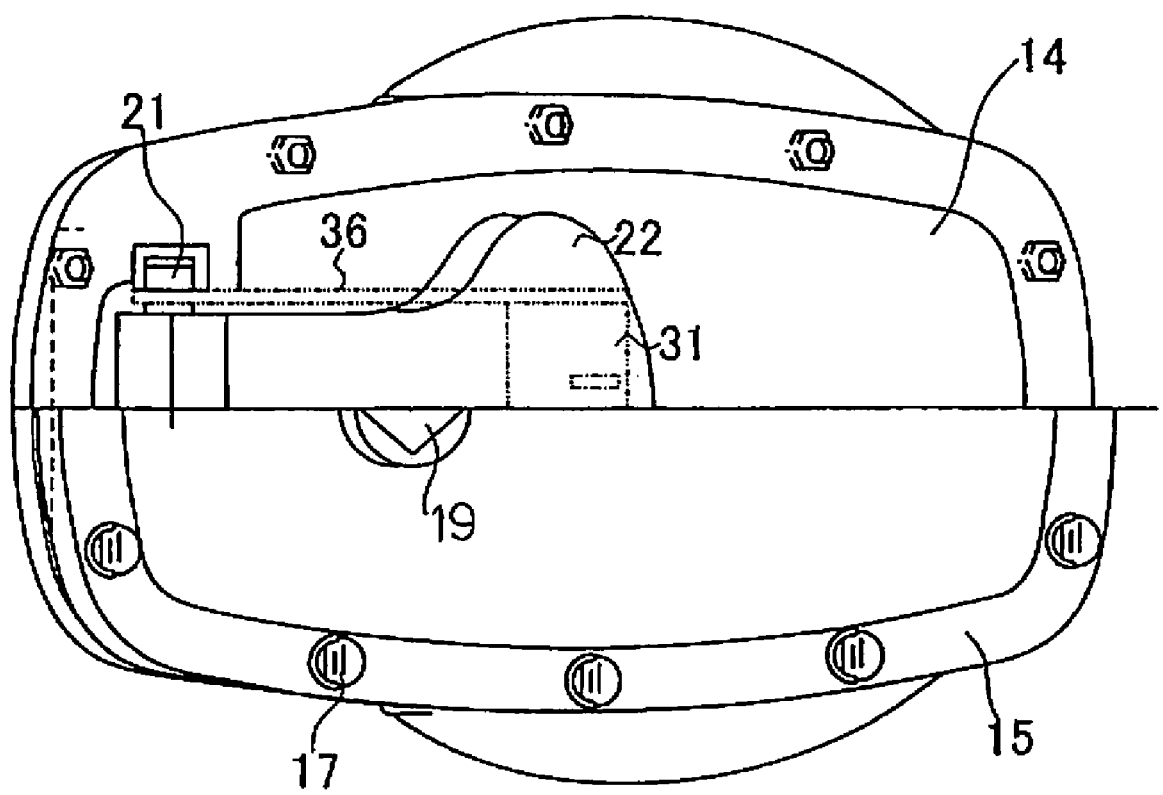
FIG. 6 is a plan view showing the check valve for use in the vacuum sewage pipe according to the present invention.

Embodiments of the present invention will be described below with reference to the drawings. FIGS. 4 through 6 are external views each showing a check valve for use in a vacuum sewage pipe according to the present invention, and each view illustrates the check valve having no closing mechanism. More specifically, FIG. 4 is a front view, FIG. 5 is a side view, and FIG. 6 is a plan view.

As shown in FIGS. 4 through 6, the check valve for use in a vacuum sewage pipe comprises a body 11 having a sewage inlet 12 and a sewage outlet 13. The sewage inlet 12 is to be connected to an upstream side of a vacuum sewage pipe (not shown in the drawings), and the sewage outlet 13 is to be connected to a downstream side of the vacuum sewage pipe. Thus, sewage is introduced into the body 11 through the sewage inlet 12, and flows out through the sewage outlet 13 toward the downstream side (i.e., in a direction indicated by arrow E). The sewage is prevented from flowing in the opposite direction.

Figure 1:
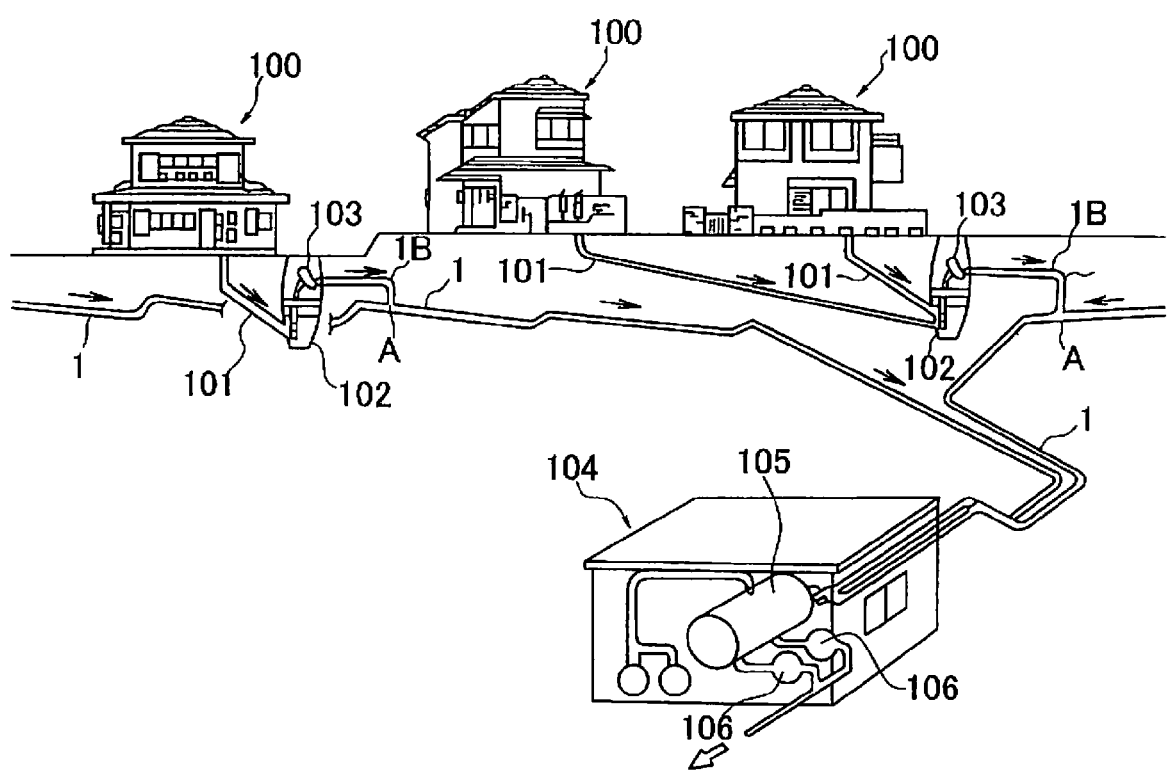
FIG. 1 is a schematic view showing an example of a vacuum sewage system.
Figure 2:
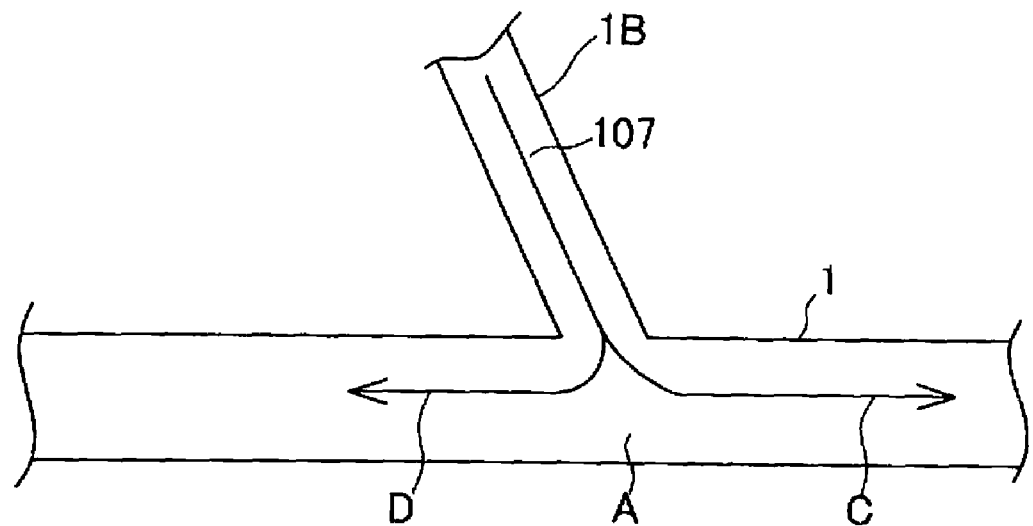
FIG. 2 is a view showing a structure in which a branch pipe is joined to a main pipe of a vacuum sewage pipe.
Figure 3:
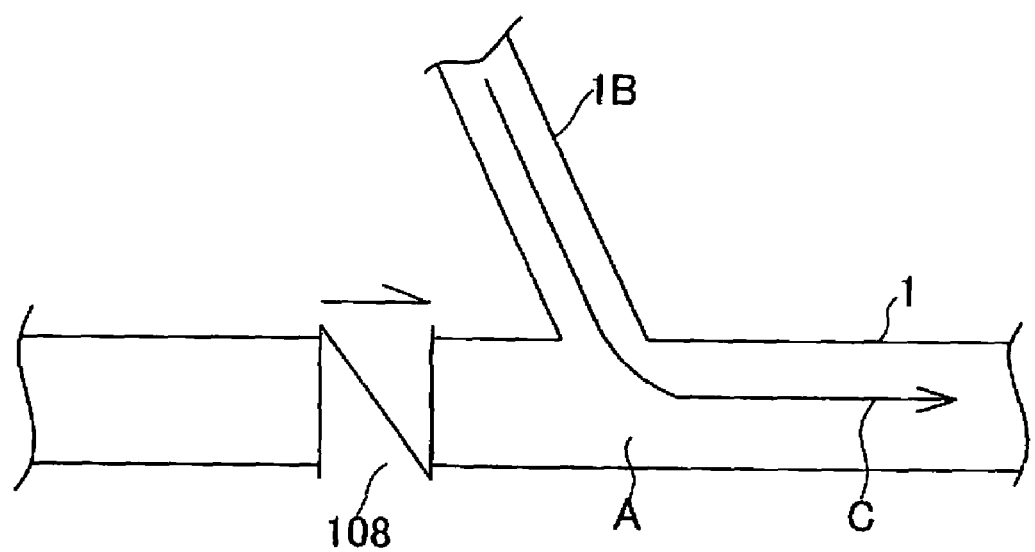
FIG. 3 is a view showing an arrangement example in which a check valve is installed at a position upstream of a junction point where the branch pipe is joined to the main pipe.

The body 11 has an opening 14 at its upper portion. This opening 14 is covered with a lid 15. A packing 16 is interposed between the body 11 and the lid 15. A plurality of (ten in the drawings) bolts 17 are provided to fix the lid 15 to the body 11. The lid 15 has a small hole 18, which is hermetically sealed by a plug 19 (see FIG. 7). During operation of the check valve 10, the sewage and air flow together through the vacuum sewage pipe 1 (see FIG. 1) connected to the sewage inlet 12 and the sewage outlet 13, and the body 11 is hermetically sealed by the lid 15. Accordingly, the air always exists in an air-retaining chamber 20 formed in an upper portion of the inside space of the body 11. A flap valve element 22 is rotatably supported by a first shaft 21, which is located at an upper position of the air-retaining chamber 20. With this arrangement, while the sewage is flowing through the check valve 10, the sewage does not reach the a first shaft 21. Therefore, particles in the sewage are not stuck or caught by the a first shaft 21.

In the above-mentioned check valve 10 for use in the vacuum sewage pipe, the air in the air-retaining chamber 20 is not removed therefrom so long as the check valve 10 is used under the ordinary situations. However, when used under a particular situation, i.e., under the conditions that a vacuum sewage collection apparatus is designed so as to reduce an air-liquid ratio of the flowing sewage, most of the air in the air-retaining chamber 20 can be removed. In such a case, the plug 19 is removed from the lid 15, and a vent pipe (not shown in the drawings) is connected to the hole 18. Further, the vent pipe is coupled to a valve so that air leaks out through the valve little by little into the air-retaining chamber 20. With this structure, even if a small amount of air flows through the vacuum sewage pipe 1 due to a low air-liquid ratio, the air can be supplied through the valve into the air-retaining chamber 20, whereby a predetermined amount of air can be retained in the air-retaining chamber 20 at all times. This structure helps to prevent the particles in the sewage from being stuck or caught by the first shaft 21.

Figure 7:
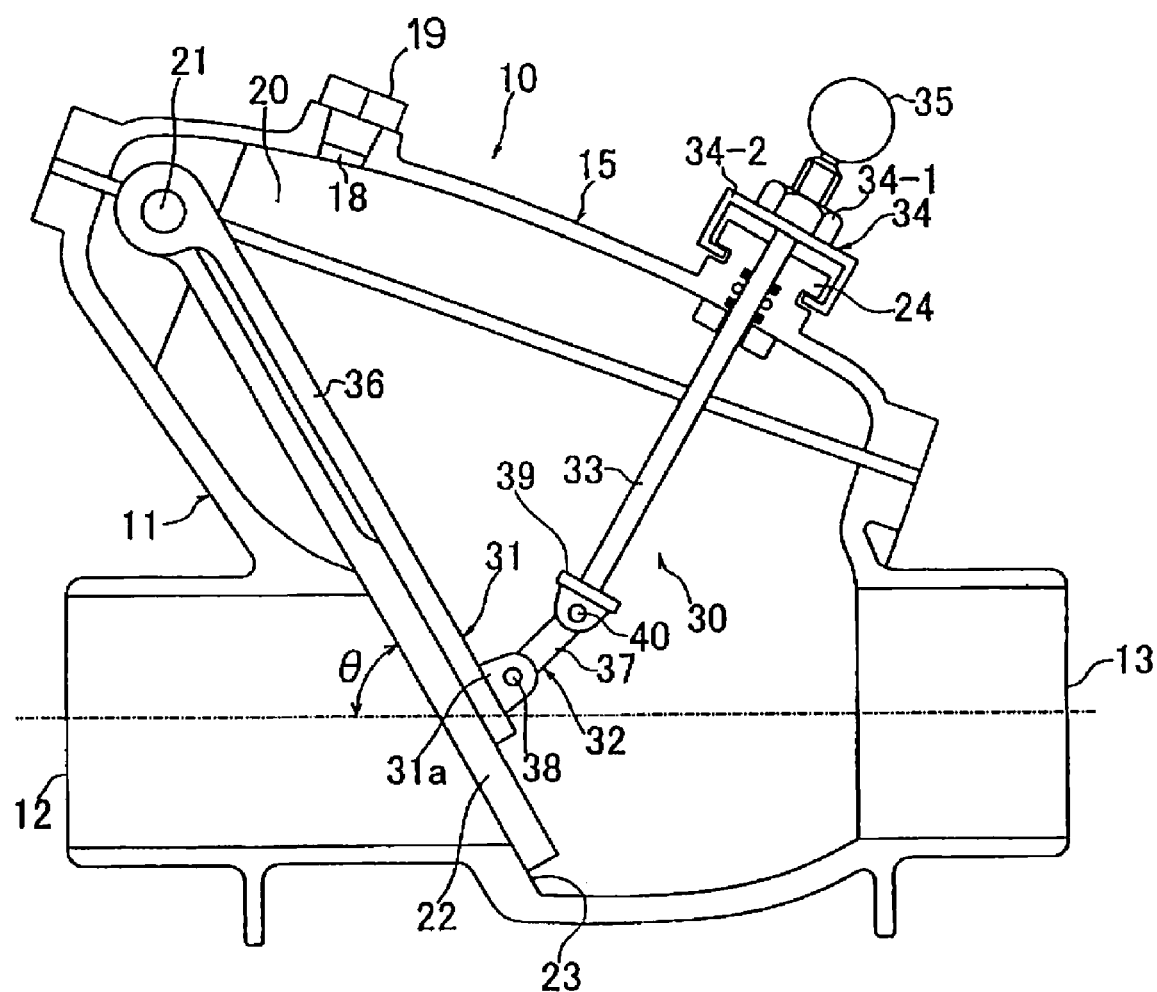
FIG. 7 is a cross-sectional side view showing the check valve when a flap valve element is closed.

FIG. 7 is a cross-sectional side view showing an interior structure of the check valve having a closing mechanism according to the present invention. The flap valve element 22 is disposed in the body 11 and rotatably supported by the first shaft 21. This flap valve element 22 is brought into contact with a valve seat 23 formed at an end portion of the sewage inlet 12 so that the sewage inlet 12 is hermetically closed. The flap valve element 22 has enough rigidity to prevent deformation thereof due to pressure (e.g., liquid pressure and air pressure) applied thereto, and is made of a material having a high specific gravity. A soft material layer, which is made of soft material (e.g., rubber), is attached to an outer surface of the flap valve element 22. This soft material layer may be attached to at least a portion of the outer surface that contacts the valve seat 23. When in contact with the valve seat 23, the flap valve element 22 is inclined at an angle of $\theta°$ from a linear line L connecting the center of the sewage inlet 12 with the center of the sewage outlet 13. In other words, the valve seat 23 has a sealing surface sloping at an angle of $\theta°$. This angle $\theta°$ is set to be at least 30°, but less than 90°. In FIG. 7, the angle $\theta°$ is 60°. With these arrangements, the weight of the flap valve element 22 is applied to the sealing surface of the valve seat 23, whereby the check valve 10 according to the present invention can function as a check valve to effectively prevent a backward flow of the sewage and the air.

Figure 8:
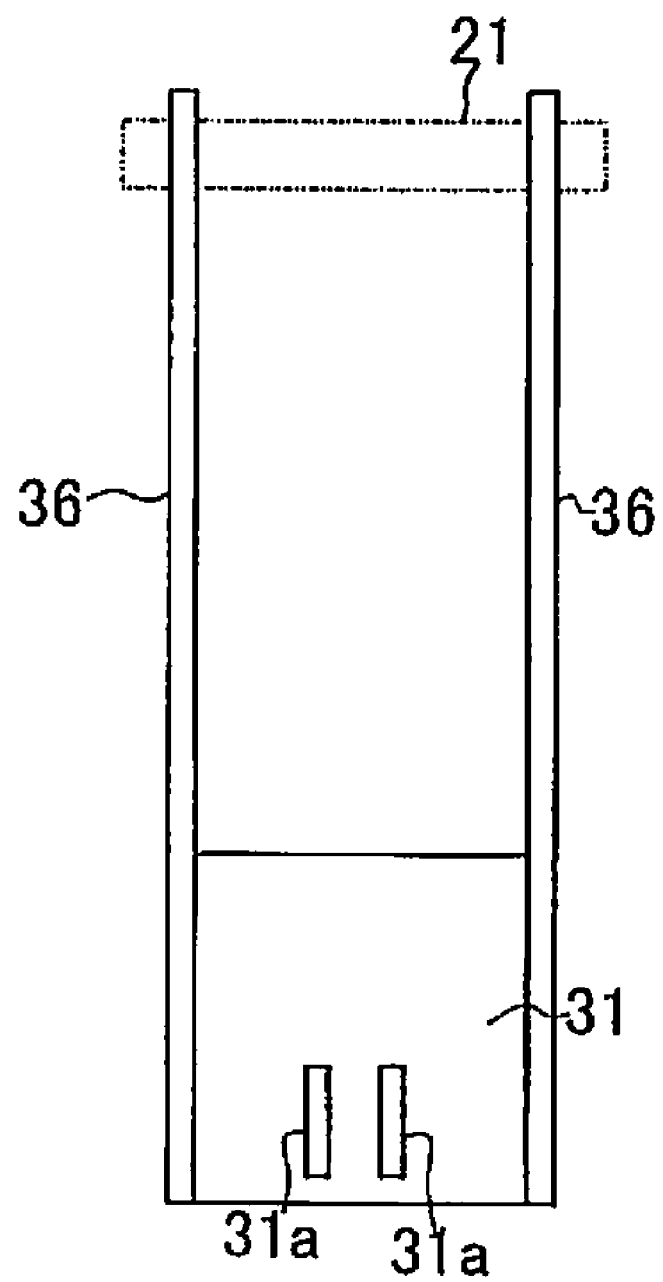
FIG. 8 is a view showing a pressing member of a closing mechanism in the check valve according to the present invention.

The check valve has a closing mechanism 30 for pressing and fixing the flap valve element 22 to the valve seat 23 to thereby allow the check valve according to the present invention to function as a gate valve (i.e., a section valve). The closing mechanism 30 comprises a pressing member 31 for pressing (pressurizing) the flap valve element 22 from above, a joint section 32, a second shaft 33, a fastening member 34, and a handle 35. The pressing member 31 is, as shown in FIG. 8, attached to ends of two arms 36 and 36 arranged in parallel. The other ends of the arms 36 and 36 are connected (coupled) to the first shaft 21. Thus, the pressing member 31 is rotatable through a certain angle via the arms 36 and 36 and the first shaft 21. A pair of connecting protrusion-members 31a and 31a is provided on an upper surface of the pressing member 31. One end of a rod 37 is inserted between the connecting protrusion-members 31a and 31a, and is coupled to these connecting protrusion-members 31a and 31a via a pin 38, as shown in FIG. 7. Another end of the rod 37 is coupled to a second stopper 39 via a pin 40. This second stopper 39 is mounted on a tip end of the second shaft 33.

Figure 9A:
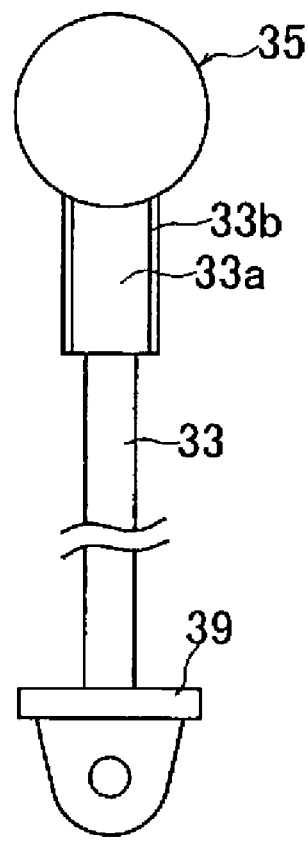
FIGS. 9A through 9D are views each showing a component of the closing mechanism in the check valve according to the present invention.
Figure 10A:
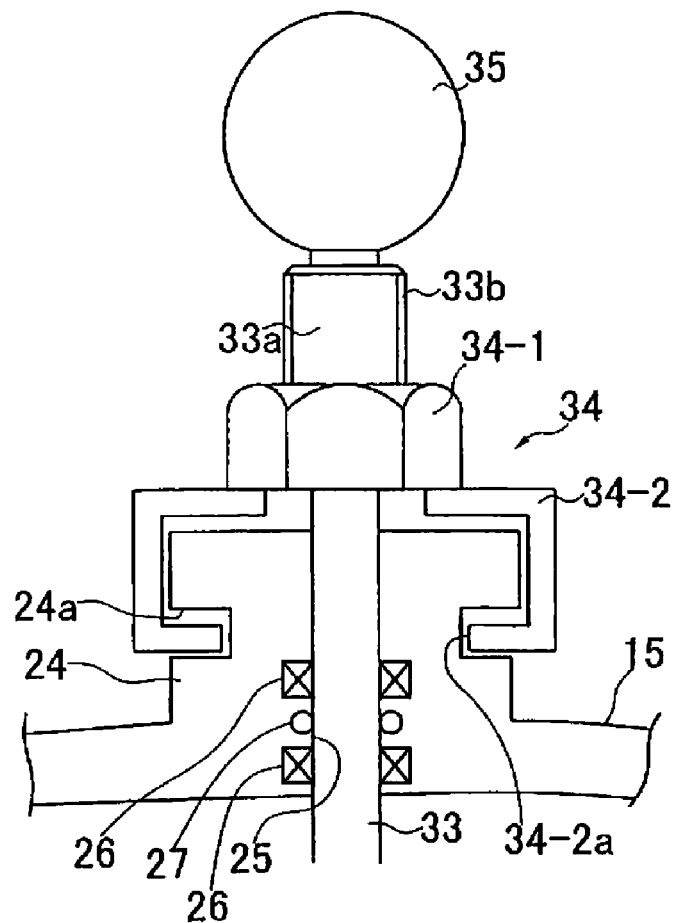
FIGS. 10A and 10B are views each showing a fastening section of the closing mechanism in the check valve according to the present invention.

As shown in FIGS. 9A and 10A, another end (rear end) of the second shaft 33 constitutes a large-diameter portion 33a, and a thread groove 33b is formed on a circumferential surface of the large-diameter portion 33a. The handle 35 is fixed to an end of the large-diameter portion 33a. As an example, the handle 35 has a bolt-insertion hole and the large-diameter portion 33a has a bolt at a center thereof, so that the handle 35 is fixed to the large-diameter portion 33a by inserting the bolt into the bolt-insertion hole. A cylindrical through-hole section 24 is formed on an upper surface of the lid 15 at a predetermined position. This through-hole section 24 has a through-hole 25 through which the second shaft 33 extends. The fastening member 34 is provided for moving the second shaft 33 downwardly to pressurize (press) the flap valve element 22 via the pressing member 31. The fastening member 34 has a guide member 34-2 and a nut member 34-1 fixed to an upper surface of the guide member 34-2. This nut member 34-1 is configured to engage the thread groove 33b of the large-diameter portion 33a. The through-hole section 24 has an outer circumferential surface having a guide groove 24a for guiding rotation of the guide member 34-2 of the fastening member 34. The guide member 34-2 has a protrusion portion 34-2a at a lower end thereof. This protrusion portion 34-2a is configured to engage the guide groove 24a, so that the fastening member 34 can rotate around the through-hole section 24.

Figure 9B:
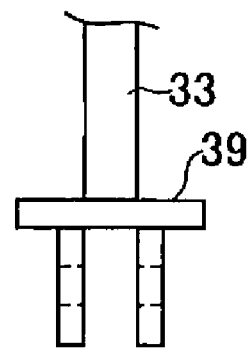
Figure 9C:
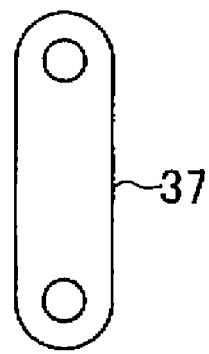
Figure 9D:
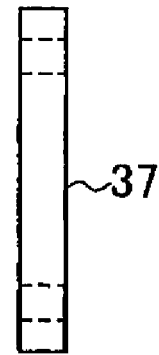
Figure 10B:
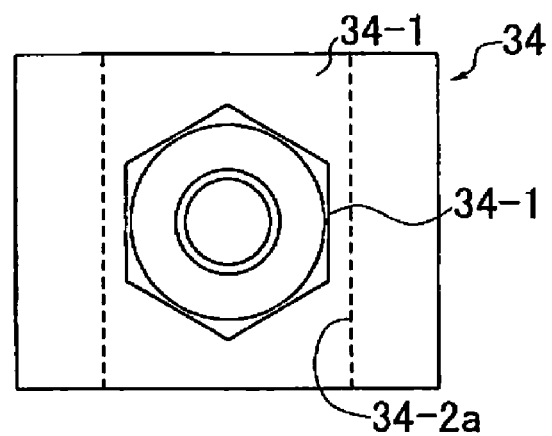

The through-hole section 24 and the lid 15 have the through-hole 25 through which the second shaft 33 extends. Scrapers 26 are provided on an inner surface of the through-hole 25 for removing foreign matters attached to the surface of the second shaft 33. Further, a sealing member 27, such as an O-ring, is provided for sealing a gap between the second shaft 33 and the through-hole 25. The scrapers 26 are arranged such that the sealing member 27 is positioned therebetween. Only one of the scrapers 26 may be provided. FIG. 8 is a plan view showing the components including the pressing member 31 of the closing mechanism 30. FIGS. 9A through 9D are views showing the components including the joint section 32 and the second shaft 33 of the closing mechanism 30. More specifically, FIGS. 9A and 9B show the second shaft 33 and the handle 35, and FIGS. 9C and 9D show the rod 37. FIGS. 10A and 10B are views each showing a structure of a fastening section of the closing mechanism. More specifically, FIG. 10A shows a cross-sectional view of the fastening section, and FIG. 10B shows a plan view of the fastening member.

The check valve 10 having the above-mentioned closing mechanism 30 is operated as follows. As shown in FIG. 7, the second shaft 33 is moved downwardly into the body 11, and the nut member 34-1 of the fastening member 34 is screwed to engage the thread groove 33b formed on the outer circumferential surface of the large-diameter portion 33a of the second shaft 33. The fastening member 34 (the nut member 34-1) is further rotated so that the second shaft 33 presses the pressing member 31 via the joint section 32, whereby the flap valve element 22 is fixed to the valve seat 23. The check valve 10 in this state functions as the gate valve (i.e., section valve).

Figure 11:
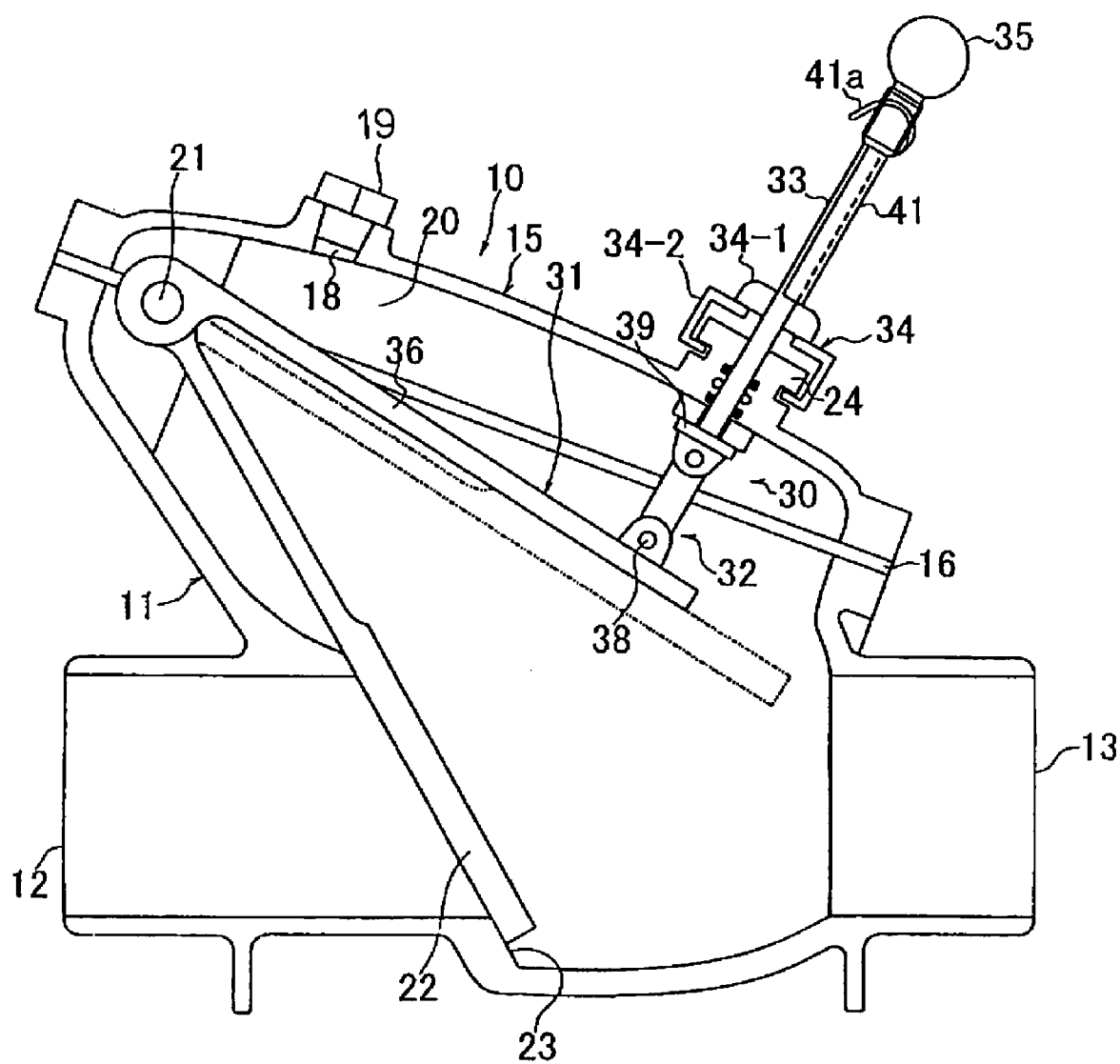
FIG. 11 is a cross-sectional side view showing the check valve when the flap valve element is opened.

When the check valve 10 is to be used as a check valve, the nut member 34-1 of the fastening member 34 and the thread groove 33b of the large-diameter portion 33a are disengaged, as shown in FIG. 11. Then, the handle 35 is pulled up until the second stopper 39 mounted on the tip end of the second shaft 33 reaches the inner surface of the body 11. In this state, a first stopper 41 is attached between the nut member 34-1 and the large-diameter portion 33a to thereby prevent falling of the second shaft 33 and to keep the pressing member 31a t a predetermined position. As a result, the flap valve element 22 can freely rotate about the first shaft 21, and can thus be moved away from the valve seat 23. The check valve 10 in this state functions as a check valve. When the flap valve element 22 is fully opened, the pressing member 31 serves as a stopper for limiting an opening degree of the flap valve element 22. The first stopper 41 comprises a semicylindrical body, which is to be attached between the nut member 34-1 and the large-diameter portion 33a as described above. The first stopper 41 has a fastening member 41a, such as a chain, at its upper end. This fastening member 41a is used to bind the first stopper 41 to the large-diameter portion 33a of the second shaft 33.

Figure 12:
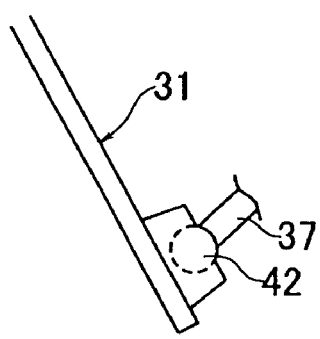
FIG. 12 is a view showing a joint section of the closing mechanism in the check valve according to the present invention.

In this embodiment, the joint section 32 of the closing mechanism 30 has the rod 37 having one end coupled to the connecting protrusion-members 31a and 31a of the pressing member 31 via the pin 38. However, the joint section 32 is not limited to this structure. For example, as shown in FIG. 12, the joint section 32 may have a rod 37 having a ball joint 42 tiltably coupled to the pressing member 31.

This check valve 10 for use in the vacuum sewage pipe can function as the inspection port by removing the lid 15 from the body 11 to allow the opening 14 to serve as the test-ball insertion port.

Figure 13:
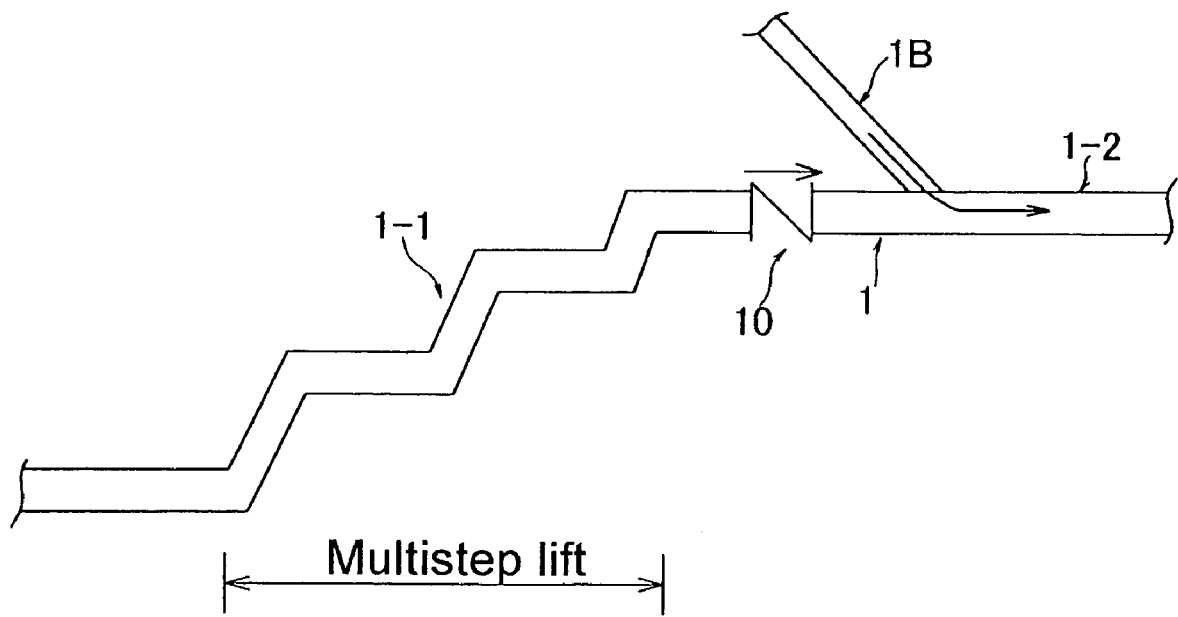
FIG. 13 is a view showing an arrangement example of the check valve according to the present invention.

FIG. 13 is a view showing an arrangement example of the check valve used in a vacuum sewage pipe according to the present invention. As shown in FIG. 13, a vacuum sewage pipe 1, serving as a main pipe, comprises a multistep lift pipe 1-1 (i.e., a multistep lift) and a horizontal pipe 1-2 connected to the multistep lift pipe 1-1. A branch pipe 1B is connected to a junction point where the multistep lift pipe 1-1 and the horizontal pipe 1-2 are joined to one another. In this system for use in delivering the sewage to a non-illustrated vacuum station, the above-mentioned check valve 10 is disposed in the main pipe at a location upstream of the junction point. More specifically, the check valve 10, serving as the gate valve and the check valve, is arranged upstream of the junction point where the branch pipe 1B is joined to the vacuum sewage pipe 1. With this arrangement, the check valve 10 functions as the check valve to prevent the backward flow of the sewage in the vacuum sewage pipe 1, and can therefore allow the sewage to flow smoothly. More specifically, because the check valve 10 is disposed upstream of the junction point, the sewage from the branch pipe 1B does not flow in the backward direction through the vacuum sewage pipe 1. Accordingly, the sewage does not stay in the multistep lift pipe 1-1, and does not increase a loss in the pipe. Further, the check valve 10 can function as the gate valve by fixing the flap valve element 22 to the valve seat 23. The horizontal pipe 1-2 has a gradient of a certain degree. For example, the horizontal pipe 1-2 may have a gradient of about 0.1%.

Figure 14A:
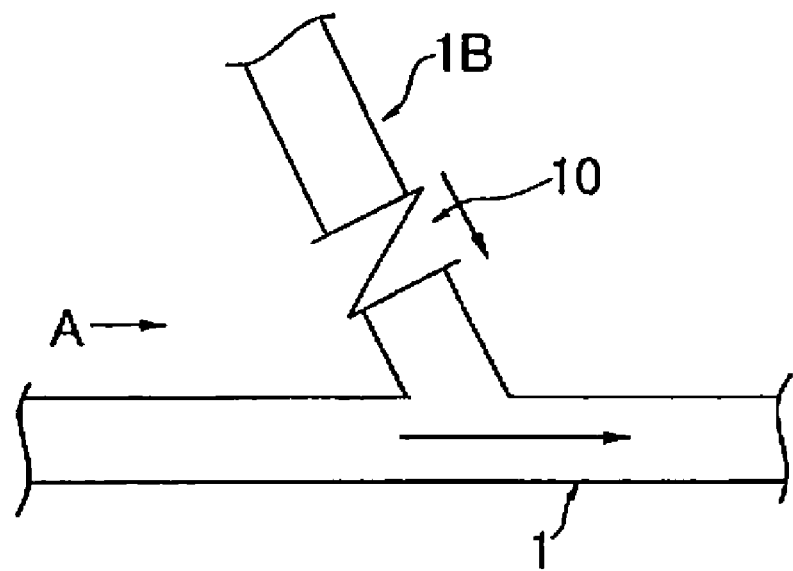
FIG. 14 is a view showing an arrangement example of the check valve according to the present invention.
Figure 14B:
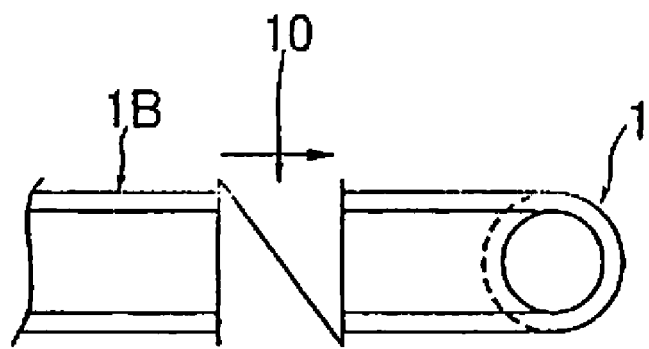

FIGS. 14A and 14B are views each showing another arrangement example of the check valve used in the vacuum sewage pipe according to the present invention. Conventionally (i.e., in the above-mentioned "vacuum sewage collection system technical manual"), a vacuum sewage pipe 1 of a main pipe and a branch pipe 1B can be merged in a horizontal plane only in a case where a diameter of the vacuum sewage pipe 1 is not less than twice that of the branch pipe 1B. In this embodiment, the diameter of the vacuum sewage pipe 1 is equal to that of the branch pipe 1B. The check valve 10, which functions as the gate valve and the check valve, is provided in the branch pipe 1B at a location upstream of the junction point where the branch pipe 1B is joined to the vacuum sewage pipe 1. This arrangement can prevent the sewage in the vacuum sewage pipe 1 from flowing back into the branch pipe 1B, and can thus allow the vacuum sewage pipe 1 and the branch pipe 1B to be joined in a horizontal plane. FIG. 14A is a plan view and FIG. 14B is a cross-sectional view from a direction indicated by arrow A in FIG. 14A.

Figure 15A:
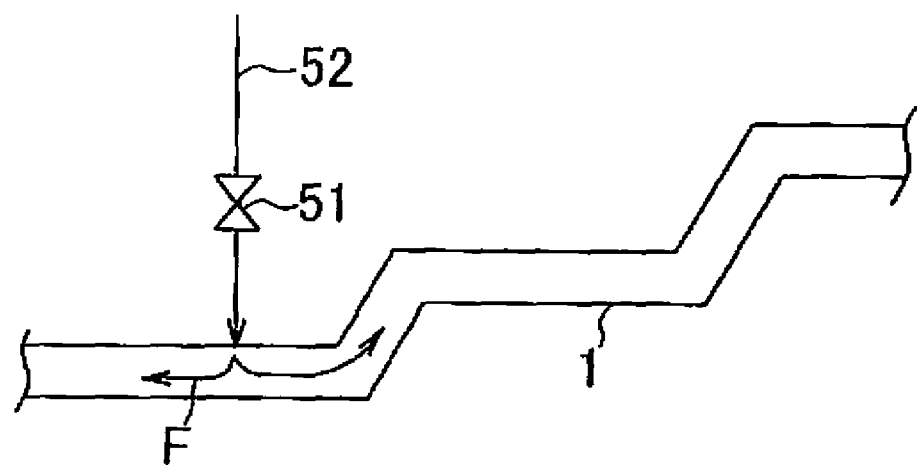
FIG. 15 is a view showing an arrangement example of the check valve according to the present invention.
Figure 15B:
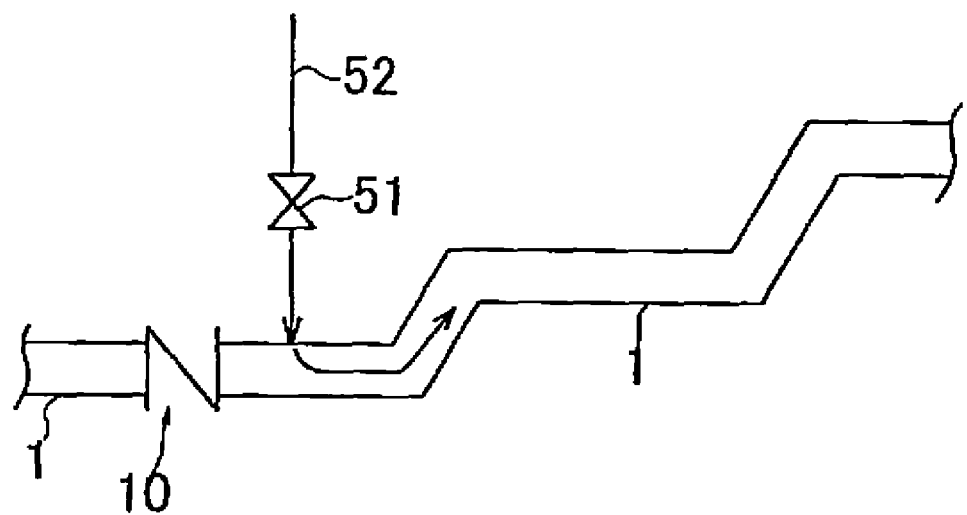

FIG. 15B is a view showing another arrangement example of the check valve used in the vacuum sewage pipe according to the present invention. In some conventional systems having a multistep lift through which the sewage is collected and delivered to the vacuum station, as shown in FIG. 15A, an automatic suction apparatus having a suction pipe 52 and a valve 51 is provided at a location upstream of the multistep lift in order to release air lock. This automatic suction apparatus is operated when a degree of vacuum in the vacuum sewage pipe 1 is lowered. More specifically, the valve 51 is opened to allow the vacuum sewage pipe 1 to suck the air. This air releases the air lock of the vacuum sewage pipe 1, whereby a high degree of vacuum in the downstream side can extend to the upstream side of the multistep lift. Then, the automatic suction apparatus stops its operation and the valve 51 is closed. In this manner, the air lock is released, and a higher degree of vacuum can be developed in the vacuum sewage pipe 1 than that set in the automatic suction apparatus.

When the above automatic suction apparatus is operated to open the valve 51 and the air is sucked, the air flows not only toward the downstream side, but also toward the upstream side as indicated by arrow F in FIG. 15A, causing a backward flow of the sewage. Thus, as shown in FIG. 15B, the check valve 10 according to the present invention is installed in the vacuum sewage pipe 1 at a location upstream of the suction pipe 52. This arrangement can prevent the backward flow that would occur when the valve 51 is opened. Further, in this case also, the check valve 10 can be used as the gate valve.

Figure 16A:
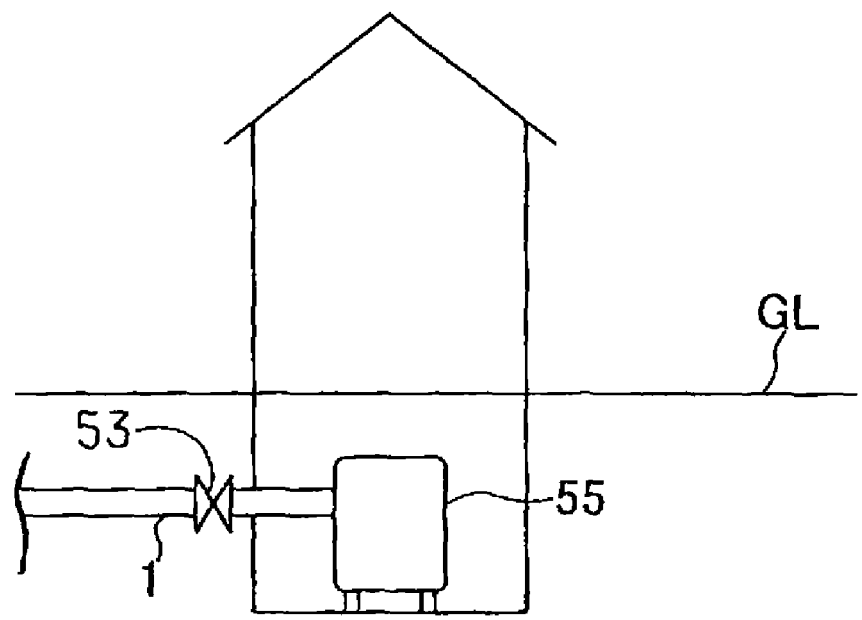
FIG. 16 is a view showing an arrangement example of the check valve according to the present invention.
Figure 16B:
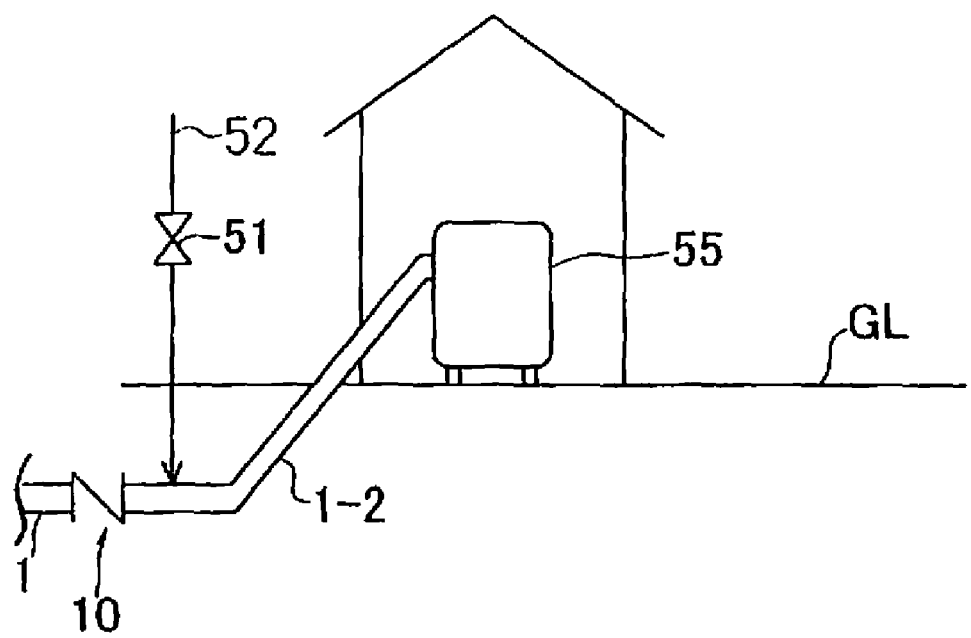

FIG. 16B is a view showing another arrangement example of the check valve used in the vacuum sewage pipe according to the present invention. As shown in FIG. 16A, the sewage is collected through the vacuum sewage pipe 1 into a sewage collection tank 55 in the vacuum station. In this case, it has been customary to install the vacuum sewage pipe 1 horizontally and to install the sewage collection tank 55 under the ground (in the drawings, GL represents the ground level) because of a loss due to the lift of the vacuum sewage pipe 1. However, this arrangement requires constructions to install the sewage collection tank 55 under the ground.

Thus, as shown in FIG. 16B, a lift pipe is provided to couple the vacuum sewage pipe 1 to the sewage collection tank 55, the automatic suction apparatus having the suction pipe 52 and the valve 51 is provided upstream of the lift pipe, and the check valve 10 according to the present invention is provided in the vacuum sewage pipe 1 at a location upstream of the automatic suction apparatus. In FIG. 16B, the valve 51 may use a power source of the vacuum station and may be combined with a motor operated valve, a pressure sensor, and a control device.

This arrangement shown in FIG. 16B can securely reduce the pressure loss in the lift pipe 1-2 connected to the sewage collection tank 55 in a short period of time, and does not narrow a sewage-collection area of the vacuum sewage system. Further, this arrangement can eliminate the need to install the sewage collection tank 55 and other structures under the ground. In the conventional system, it is necessary to install a gate valve 53 at a location corresponding to the check valve 10 as shown in FIG. 16A. On the other hand, because the check valve 10 according to the present invention also functions as the gate valve, it is not necessary to install a gate valve in addition to the check valve 10. In FIG. 16B, the lift pipe 1-2 may be a multistep pipe.

As discussed above, the present invention can bring the following advantages.

(i) Because the body is provided with the closing mechanism that keeps the flap valve element in the closed state, the check valve according to the present invention can serve as the gate valve.

(ii) Because the closing mechanism can limit the opening degree of the flap valve element, there is no need to provide a stopper for limiting the opening degree of the flap valve element.

(iii) Because the lid can be removed from the opening of the body to allow the opening to be used as the test-ball insertion port, the check valve according to the present invention can serve as the inspection port.

(iv) Because the check valve according to the present invention can serve as the check valve, the gate valve, and the inspection port, there is no need to provide any gate valve and inspection port in the vacuum sewage pipe of the vacuum sewage system. Accordingly, the vacuum sewage system can be constructed at a low cost. The check valve according to the present invention can be installed in the vacuum sewage pipe of the vacuum sewage system having the automatic suction apparatus. In this case, the check valve according to the present invention can prevent the backward flow of the sewage that would occur in the conventional system, and can thus securely release the air lock in a short period of time and can recover the degree of vacuum.

Although certain preferred embodiments of the present invention have been described, it should be understood that various changes and modifications may be made without departing from the scope of claims for patent, and the scope of the technical concept described in the specification and drawings.

What is claimed is:

1. A check valve for use in a vacuum sewage pipe, said check valve comprising:
    a body having a sewage inlet and a sewage outlet to be coupled to the vacuum sewage pipe;
    a flap valve element disposed in said body and rotatably supported by a first shaft to prevent a backward flow of sewage;
    a pressing member coupled to said first shaft and rotatable about said first shaft independently of said flap valve element to press against said flap valve element; and
    a second shaft connected to said pressing member and movable inward and outward relative to said body to define an angle of said pressing member,
    wherein said second shaft has a thread groove capable of being engaged with a fastening member disposed on said body, and
    wherein said pressing member is locked at a lowermost position by engagement between said fastening member and said thread groove to keep said flap valve element in a closed state to allow said flap valve element to function as a gate valve that blocks off a flow of sewage.

2. The check valve according to claim 1, wherein said pressing member is adapted to limit an opening degree of said flap valve element.

3. The check valve according to claim 1, wherein:
    said body has an opening and a lid closing said opening; and
    said lid is removable so that said opening serves as a test-ball insertion port.

4. The check valve according to claim 1, wherein said second shaft is connected to said pressing member via a joint section.

5. The check valve according to claim 4, wherein said joint section comprises a rod having a first end pivotally connected to said second shaft and a second end pivotally connected to said pressing member.

6. The check valve according to claim 1, wherein a lowermost portion of said pressing member is positioned above said sewage inlet and said sewage outlet when said second shaft is at a most outward position relative to said body.

7. The check valve according to claim 1, further comprising a soft material layer attached on said flap valve element.

8. The check valve according to claim 7, wherein said soft material layer is made of rubber.

9. A vacuum sewage system, comprising:
    a vacuum valve unit;
    a vacuum sewage pipe;
    a vacuum station;
    an automatic suction apparatus coupled to said vacuum sewage pipe; and
    a check valve according to claim 5 installed in said vacuum sewage pipe.

* * * * *